(12) United States Patent
Bailey et al.

(10) Patent No.: US 9,324,112 B2
(45) Date of Patent: Apr. 26, 2016

(54) RANKING AUTHORS IN SOCIAL MEDIA SYSTEMS

(75) Inventors: Peter Richard Bailey, Kirkland, WA (US); Chad Carson, Cupertino, CA (US); Scott Joseph Counts, Seattle, WA (US); Nikhil Bharat Dandekar, Bellevue, WA (US); Ho John Lee, Palo Alto, CA (US); Shubha Umesh Nabar, Mountain View, CA (US); Aditya Pal, Minneapolis, MN (US); Michael Ching, San Jose, CA (US); Paul Alexander Dow, San Francisco, CA (US); Shuang Guo, San Jose, CA (US); Hyun-Ju Seo, Mountain View, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 224 days.

(21) Appl. No.: 12/942,577

(22) Filed: Nov. 9, 2010

(65) Prior Publication Data
US 2012/0117059 A1    May 10, 2012

(51) Int. Cl.
*G06F 17/30* (2006.01)
*G06Q 50/00* (2012.01)

(52) U.S. Cl.
CPC .......... *G06Q 50/01* (2013.01); *G06F 17/30867* (2013.01)

(58) Field of Classification Search
None
See application file for complete search history.

(56) References Cited

U.S. PATENT DOCUMENTS

| | | |
|---|---|---|
| 7,239,708 B2 | 7/2007 | England et al. |
| 7,580,931 B2 | 8/2009 | Liu |
| 7,584,183 B2 | 9/2009 | Hegerty |
| 7,600,017 B2 | 10/2009 | Holtzman et al. |
| 7,818,334 B2 | 10/2010 | Najork |
| 7,930,302 B2 | 4/2011 | Bandaru et al. |
| 8,010,460 B2 | 8/2011 | Work |
| 8,312,056 B1 | 11/2012 | Peng et al. |
| 8,326,880 B2 | 12/2012 | Carson et al. |

(Continued)

FOREIGN PATENT DOCUMENTS

| | | |
|---|---|---|
| KR | 20120137542 A | 12/2012 |
| WO | 2012171073 A1 | 12/2012 |

OTHER PUBLICATIONS

"Judging a Twitter User by their Followers", Retrieved at << http://sysomos.com/insidetwitter/followers/ >>, Jun. 2010, pp. 11.

(Continued)

*Primary Examiner* — Augustine K Obisesan
*Assistant Examiner* — David T Brooks
(74) *Attorney, Agent, or Firm* — Alin Corie; Sandy Swain; Micky Minhas

(57) ABSTRACT

The author ranking technique described herein is a technique to rank authors in social media systems along various dimensions, using a variety of statistical methods for utilizing those dimensions. More particularly, the technique ranks authors in social media systems through a combination of statistical techniques that leverage usage metrics, and social and topical graph characteristics. In various exemplary embodiments, the technique can rank author authority by the following: 1) temporal analysis of link sharing in which authority is computed based on a user's propensity to provide early links to web pages that subsequently become popular; 2) topical authority based on the author's links and content updates in specific topic areas; and 3) popularity and influence based on nodal properties of authors.

20 Claims, 5 Drawing Sheets

(56) References Cited

U.S. PATENT DOCUMENTS

| | | | |
|---|---|---|---|
| 8,543,454 B2 | 9/2013 | Fleischman et al. | |
| 8,606,792 B1 | 12/2013 | Jackson et al. | |
| 8,655,938 B1 | 2/2014 | Smith et al. | |
| 2002/0062368 A1 | 5/2002 | Holtzman et al. | |
| 2003/0097655 A1 | 5/2003 | Novak | |
| 2003/0221166 A1* | 11/2003 | Farahat et al. | 715/513 |
| 2004/0128273 A1* | 7/2004 | Amitay et al. | 707/1 |
| 2005/0114896 A1 | 5/2005 | Hug et al. | |
| 2005/0159970 A1 | 7/2005 | Buyukkokten et al. | |
| 2005/0251487 A1 | 11/2005 | Evans et al. | |
| 2005/0273629 A1 | 12/2005 | Abrams et al. | |
| 2006/0004691 A1* | 1/2006 | Sifry | 707/1 |
| 2006/0042483 A1 | 3/2006 | Work et al. | |
| 2006/0184464 A1* | 8/2006 | Tseng et al. | 706/14 |
| 2006/0184481 A1* | 8/2006 | Zhang et al. | 706/45 |
| 2006/0242078 A1 | 10/2006 | Evans et al. | |
| 2006/0242554 A1 | 10/2006 | Gerace et al. | |
| 2007/0083469 A1 | 4/2007 | Kaufman | |
| 2007/0118498 A1* | 5/2007 | Song et al. | 707/1 |
| 2007/0198510 A1 | 8/2007 | Ebanks | |
| 2007/0204078 A1 | 8/2007 | Boccon-Gibbod et al. | |
| 2007/0271272 A1 | 11/2007 | McGuire et al. | |
| 2008/0066181 A1 | 3/2008 | Haveson et al. | |
| 2008/0070209 A1 | 3/2008 | Zhuang et al. | |
| 2008/0071904 A1 | 3/2008 | Schuba | |
| 2008/0109399 A1 | 5/2008 | Liao et al. | |
| 2008/0168523 A1 | 7/2008 | Ansari et al. | |
| 2008/0187231 A1 | 8/2008 | Barbieri et al. | |
| 2008/0222044 A1 | 9/2008 | Gottlieb et al. | |
| 2008/0256051 A1* | 10/2008 | Liu et al. | 707/5 |
| 2009/0006371 A1* | 1/2009 | Denoue et al. | 707/5 |
| 2009/0006398 A1* | 1/2009 | Lam et al. | 707/7 |
| 2009/0037382 A1 | 2/2009 | Ansari et al. | |
| 2009/0048904 A1 | 2/2009 | Newton | |
| 2009/0048990 A1* | 2/2009 | Gross | 706/12 |
| 2009/0049018 A1 | 2/2009 | Gross | |
| 2009/0091443 A1 | 4/2009 | Chen et al. | |
| 2009/0144418 A1 | 6/2009 | Alstyne et al. | |
| 2009/0164904 A1 | 6/2009 | Horowitz et al. | |
| 2009/0171748 A1 | 7/2009 | Aven et al. | |
| 2009/0208180 A1 | 8/2009 | Ashby et al. | |
| 2009/0217343 A1 | 8/2009 | Bellwood et al. | |
| 2009/0240944 A1 | 9/2009 | Cho et al. | |
| 2009/0276500 A1 | 11/2009 | Karmarkar | |
| 2009/0312033 A1 | 12/2009 | Shen et al. | |
| 2010/0119053 A1* | 5/2010 | Goeldi | 379/265.09 |
| 2010/0121707 A1 | 5/2010 | Goeldi | |
| 2010/0121849 A1 | 5/2010 | Goeldi | |
| 2010/0138903 A1 | 6/2010 | Medvinsky | |
| 2010/0228614 A1 | 9/2010 | Zhang et al. | |
| 2010/0228631 A1 | 9/2010 | Zhang et al. | |
| 2010/0268830 A1 | 10/2010 | McKee | |
| 2011/0022602 A1* | 1/2011 | Luo et al. | 707/748 |
| 2011/0178995 A1 | 7/2011 | Suchter et al. | |
| 2011/0218960 A1 | 9/2011 | Hatami-Hanza | |
| 2011/0231296 A1* | 9/2011 | Gross et al. | 705/37 |
| 2011/0246484 A1* | 10/2011 | Dumais et al. | 707/749 |
| 2011/0270845 A1 | 11/2011 | Lin et al. | |
| 2011/0271232 A1 | 11/2011 | Crochet et al. | |
| 2012/0059710 A1 | 3/2012 | Dutta | |
| 2012/0110464 A1 | 5/2012 | Chen et al. | |
| 2012/0117059 A1 | 5/2012 | Bailey et al. | |
| 2012/0150754 A1 | 6/2012 | Belady et al. | |
| 2012/0166931 A1 | 6/2012 | Alonso et al. | |
| 2012/0209832 A1 | 8/2012 | Neystadt et al. | |
| 2012/0209920 A1 | 8/2012 | Neystadt et al. | |
| 2012/0215597 A1 | 8/2012 | Ross | |
| 2012/0221559 A1 | 8/2012 | Kidron | |
| 2012/0226536 A1 | 9/2012 | Kidron | |
| 2012/0254184 A1 | 10/2012 | Choudhary et al. | |
| 2012/0317200 A1 | 12/2012 | Chan | |
| 2012/0324023 A1 | 12/2012 | Di Sciiullo et al. | |
| 2012/0331399 A1 | 12/2012 | Eidelson et al. | |
| 2013/0006736 A1 | 1/2013 | Bethke et al. | |
| 2013/0013678 A1 | 1/2013 | Murthy | |
| 2013/0014223 A1 | 1/2013 | Bhatia et al. | |
| 2013/0041860 A1 | 2/2013 | Lawrence et al. | |
| 2013/0054591 A1 | 2/2013 | Park et al. | |
| 2013/0054631 A1 | 2/2013 | Govani et al. | |
| 2013/0066706 A1 | 3/2013 | Wu et al. | |
| 2013/0066711 A1 | 3/2013 | Llyanage et al. | |
| 2013/0085838 A1 | 4/2013 | Tennenholtz et al. | |
| 2013/0097180 A1 | 4/2013 | Tseng | |
| 2013/0117097 A1 | 5/2013 | Bachman | |
| 2013/0117364 A1 | 5/2013 | Bania et al. | |
| 2013/0124626 A1 | 5/2013 | Cathcart et al. | |
| 2013/0151345 A1 | 6/2013 | Brelig | |
| 2013/0151348 A1 | 6/2013 | Paul et al. | |
| 2013/0173333 A1 | 7/2013 | Zhang et al. | |
| 2013/0173485 A1 | 7/2013 | Ruiz et al. | |
| 2013/0179440 A1 | 7/2013 | Gordon | |
| 2013/0197970 A1 | 8/2013 | Aaskov et al. | |
| 2013/0212479 A1 | 8/2013 | Willis et al. | |
| 2013/0254280 A1 | 9/2013 | Yang et al. | |
| 2013/0311563 A1 | 11/2013 | Huberman et al. | |
| 2014/0089059 A9 | 3/2014 | Vesely et al. | |
| 2014/0189000 A1 | 7/2014 | Zhang et al. | |
| 2014/0189536 A1 | 7/2014 | Lange et al. | |

OTHER PUBLICATIONS

"Author Ranking System", Retrieved at << http://www.customerthink.com/author_ranking >>, Retrieved Date: Aug. 6, 2010, pp. 3.

Straw., "3 Quick Ways to Check your Twitter Ranking/Reach/Authority", Retrieved at << http://allthatsnew.wordpress.com/2009/01/12/3-quick-ways-to-check-your-twitter-rankingreachauthority/ >>, Jan. 12, 2009, pp. 7.

Elsas, Jonathan L., "Search in Conversational Social Media Collections", Retrieved at << http://www.cs.cmu.edu/~jelsas/papers/SSM2010_SearchConvSocialMedia.pdf >>, In Third Annual Workshop on Search in Social Media (SSM), Feb. 3, 2010, pp. 2.

Gill, Kathy E., "How can we Measure the Influence of the Blogosphere?", Retrieved at << http://citeseerx.ist.psu.edu/viewdoc/download?doi=10.1.1.124.2509&rep=rep1&type=pdf >>, World Wide Web Conference, May 17-22, 2004; pp. 10.

"Spinn3r", Retrieved at << http://spinn3r.com/rank/ >>, Jun. 13, 2009, pp. 3.

"About your PeerIndex Score", Retrieved at << http://www.peerindex.net/help/scores >>, Retrieved Date: Aug. 6, 2010, pp. 3.

Weng, et al., "Twitterrank: finding topic-sensitive influential twitterers", Retrieved at << http://www.mysmu.edu/staff/jsweng/papers/TwitterRank_WSDM.pdf >>, In the Proceedings of the 3rd ACM International Conference on Web Search and Data Mining, WSDM, Feb. 4-6, 2010, pp. 10.

Afrati, F et al.; "Optimizing Joins in a Map-Reduce Environment"; Proceedings of the 13th International Conference on Extending Database Technology; Aug. 24-28, 2009; 15 pages.

Balkir, A.; "Big Data: Simulating Secondary Soft on Values with Hadoop"; accessed at sonerbalkir.blogspot.com/2010/01/simulating-secondary-sort-on-values.html; Jan. 26, 2010; pp. 1-6.

Gao, B. et al.; "Ranking on Large-Scale Graphs with Rich Metadata"; Proceedings of the 20th International Conference Companion on World Wide Web; Mar. 28-Apr. 1, 2011; pp. 285-286.

Gryc, W. et al.; "Leveraging Textual Sentiment Analysis with Social Network Modelling"; Text to Political Positions Workshop; Apr. 9-10, 2010; 14 pages.

"Infer.NET"; Microsoft Research; accessed at research.microsoft.com/en-us/um/cambridge/projects/infernet/; retrieved Jan. 18, 2012; 1 page.

Java, A. et al.; "Why We Twitter: Understanding Microblogging Usage and Communities"; Proceedings of the 9th WebKDD and 1st SNA-KDD Workshop on Web Mining and Snetwork Analysis; Aug. 12, 2007; pp. 56-65.

Pal, A. et al.; "Identifying Topical Authorities in Microblogs"; Proceedings of the 4th ACM International Conference on Web Search and Data Mining; 2011; pp. 45-54.

Tan, C. et al.; "User-Level Sentiment Analysis Incorporating Social Networks"; Proceedings of the 17th ACM SIGKDD International Conference on Knowledge Discovery and Data Mining; Aug. 21-24, 2011; pp. 1397-1405.

(56) References Cited

OTHER PUBLICATIONS

Tang, J. et al.; "Social Influence Analysis in Large-scale Networks"; Proceedings of the 15th ACM SIGKDD International Conference on Knowledge Discovery and Data Mining; Jun. 28-Jul. 1, 2009; pp. 807-816.
Zaman, T; "Information Extraction with Network Centralities: Finding Rumor Sources, Measuring Influence, and Learning Community Structure"; Ph.D Thesis; Massachusetts Institute of Technology; Sep. 2011; pp. 1-197 (three parts).
International Search Report & Written Opinion for PCT Patent Application No. PCT/US2013/078394, Mailed Date: Aug. 13, 2014, 10 Pages.
"Notice of Allowance" from U.S. Appl. No. 12/979,232, Mailed Dec. 19, 2014.
Pinto et al., "Clustering Narrow-Domain Short texts by Using the Kullback-Leibler Distance", CICLing 2007, LNCS 4392, pp. 611-622, 2007, by Springer-Verlag Berlin Heidelberg 2007.
U.S. Appl. No. 12/753,909, filed Apr. 5, 2010 by Inventors Charles C. Carson et al., 47 Pages.
U.S. Appl. No. 12/691,145, filed Jan. 21, 2010 by Inventors Sean Suchter et al., 36 Pages.
"International Search Report and Written Opinion," Mailed Oct. 31, 2014, from PCT Patent Application No. PCT/US2013/078395, 12 Pages.
"Non-Final Office Action," Mailed Sep. 12, 2014, from U.S. Appl. No. 13/733,034, 25 Pages.
"Requirement for Restriction/Election," Mailed Mar. 13, 2012, from U.S. Pat. No. 8,326,880, 7 pages.
"Response to Restriction Requirement," Filed Apr. 18, 2012, from U.S. Pat. No. 8,326,880, 9 pages.
"Non-Final Office Action," Mailed Apr. 18, 2012, from U.S. Pat. No. 8,326,880, 10 pages.
"Amendment and Response to Non-Final Office Action," Filed Jul. 17, 2012, from U.S. Pat. No. 8,326,880, 8 pages.
"Notice of Allowance," Mailed Aug. 1, 2012, from U.S. Pat. No. 8,326,880, 5 pages.
"Non-Final Office Action," Mailed Nov. 9, 2012, from U.S. Appl. No. 12/979,232, 19 pages.
"Response to Non-Final Office Action," filed Mar. 6, 2013, from U.S. Appl. No. 12/979,232, 15 pages.
"Final Office Action," Mailed Jul. 8 2013, from U.S. Appl. No. 12/979,232, 32 pages.
"Response to Final Office Action," filed Oct. 29, 2013, from U.S. Appl. No. 12/979,232, 11 pages.
"Non-Final Office Action," Mailed Nov. 15, 2013, from U.S. Appl. No. 12/979,232, 39 pages.
"Response to Non-Final Office Action," filed Feb. 5, 2014, from U.S. Appl. No. 12/979,232, 14 pages.
"Final Office Action," Mailed Jun. 10, 2014, from U.S. Appl. No. 12/979,232, 21 pages
"Response to Final Office Action," Filed Oct. 29, 2013, from U.S. Appl. No. 12/979,232, 13 pages.
"Requirement for Restriction/Election," Mailed Dec. 28, 2011, from U.S. Appl. No. 12/691,145, 5 pages.
"Response to Restriction Requirement," filed Jan. 6, 2012, rom U.S. Appl. No. 12/691,145, 1 page.
"Non-Final Office Action," Mailed Mar. 5, 2012 from U.S. Appl. No. 12/691,145, 11 pages.
Hore et al., "Creating Streaming Iterative Soft Clustering Algorithms," Jul. 16, 2007, Retrieved at http://www.csee.usf.edu/~hall/papers/nafips07.pdf, 5 pages.
U.S. Appl. No. 12/979,232, filed Dec. 27, 2010 by Inventor Omar Alonso, 18 Pages.
"Non-Final Office Action," Mailed May 22, 2014, from U.S. Appl. No. 13/733,009, 27 pages.
"Response to Non-Final Office Action," filed Sep. 22, 2014, from U.S. Appl. No. 13/733,009, 33 pages.
Yang, et al., U.S. Appl. No. 13/427,584, filed Mar. 22, 2012, pp. 1-34.
Lange, et al., U.S. Appl. No. 13/733,009, filed Jan. 2, 2013, pp. 1-52.
Zhang, et al., U.S. Appl. No. 13/733,034, filed Jan. 2, 2013, pp. 1-53.

Final Office Action of U.S. Appl. No. 13/733,009, mailed on Jan. 27, 2015, Lange, et al, "Social Media Impact Assessment", 24 pages.
Non-Final Office Action of U.S. Appl. No. 13/427,584, mailed on Oct. 6, 2014, Yang, et al, "Identifying Influential Users of a Social Networking Service", 9 pages.
Response to Non-Final Office Action of U.S. Appl. No. 13/427,584 mailed Oct. 6, 2014, dated Jan. 6, 2015, Yang, et al, "Identifying Influential Users of a Social Networking Service", 13 pages.
Non-Final Office Action of U.S. Appl. No. 13/427,584, mailed on Jul. 1, 2013, Yang, et al, "Identifying Influential Users of a Social Networking Service", 9 pages.
Response to Non-Final Office Action of U.S. Appl. No. 13/427,584 mailed Jul. 1, 2013, dated Sep. 26, 2013, Yang, et al, "Identifying Influential Users of a Social Networking Service", 11 pages.
Final Office Action of U.S. Appl. No. 13/427,584, mailed on Jan. 16, 2014, Yang, et al, "Identifying Influential Users of a Social Networking Service", 9 pages.
Response to Final Office Action of U.S. Appl. No. 13/427,584 mailed Jan. 16, 2014, dated Feb. 10, 2014, Yang, et al, "Identifying Influential Users of a Social Networking Service", 11 pages.
Non-Final Office Action of U.S. Appl. No. 13/427,584, mailed on Mar. 14, 2014, Yang, et al, "Identifying Influential Users of a Social Networking Service", 9 pages.
Response to Non-Final Office Action of U.S. Appl. No. 13/427,584 mailed Mar. 14, 2014, dated May 30, 2014, Yang, et al, "Identifying Influential Users of a Social Networking Service", 11 pages.
Final Office Action of U.S. Appl. No. 13/427,584, mailed on Jun. 19, 2014, Yang, et al, "Identifying Influential Users of a Social Networking Service", 8 pages.
Response to Final Office Action of U.S. Appl. No. 13/427,584 mailed Jun. 19, 2014, dated Sep. 19, 2014, Yang, et al, "Identifying Influential Users of a Social Networking Service", 11 pages.
Supplemental Response to Final Office Action of U.S. Appl. No. 13/427,584 mailed Oct. 6, 2014, dated Feb. 24, 2015, Yang, et al, "Identifying Influential Users of a Social Networking Service", 12 pages.
Non-Final Office Action of U.S. Appl. No. 13/733,034, mailed on Sep. 12, 2014, Zhang, et al, "Social Media Impact Assessment", 24 pages.
Response to Non-Final Office Action of U.S. Appl. No. 13/733,034 mailed on Sep. 12, 2014, dated Mar. 11, 2015, Zhang, et al, "Social Media Impact Assessment", 27 pages.
"International Search Report & Written Opinion Received for PCT Application No. PCT/US2013/078395", Mailed Date: Oct. 31, 2014, 12 pages.
U.S. Appl. No. 12/979,232, Notice of Allowance dated Dec. 19, 2014, 21 pages.
Cao et al., "Density-Based Clustering over an Evolving Data Stream with Noise", Proceedings of the 2006 Siam Conference on Data Mining, Apr. 20-26, 2006.
Hore et al., "Creating Streaming Iterative Soft Clustering Algorithms", Proceedings of the Annual Meeting of the North American Fuzzy Information Processing Society, pp. 484-488, Jun. 24-27, 2007.
Barecke et al., "Summarizing Video Information Using Self-Organizing Maps", Proceedings of the IEEE International Conference on Fuzzy Systems, pp. 540-546, Sep. 11, 2006.
Hore et al., "A Fuzzy C Means Variant for Clustering Evolving Data Streams", Proceedings of the IEEE International Conference on Systems, Man and Cybernetics, pp. 360-365, Oct. 7-10, 2007.
Nassar et al., "Effective Summarization of Multi-Dimensional Data Streams for Historical Stream Mining", Proceedings of the 19th IEEE International Conference on Scientific and Statistical Database Management, p. 30, Jul. 9-11, 2007.
Jiang et al., "Data Stream Clustering and Modeling Using Context-Trees" Proceedings of the 6th International Conference on Service Systems and Service Management, pp. 932-937, Jun. 8-10, 2009.
Yeh, Mi-Yen, "Clustering over Multiple Data Streams", Retrieved at: <<http://www.iis.sinica.edu.tw/-miyen/research.html>>, Jan. 13, 2010.
Chitu, "Google to Launch a Microblogging Search Engine", Retrieved at: <<http://googlesystem.blogspot.com/2009/06/google-to-launch-microblogging-search.html, Jun. 13, 2009.

(56) References Cited

OTHER PUBLICATIONS

Wesley, "Microsoft's Bing Search Engine to Index Microblogging and Twitter Tweets", Retrieved at:<<http://voices.yahoo.com/microsofts-bing-search-engine-index-microblogging-3721768.html?cat=15>>, Jul. 2, 2009.

Grosseck et al., "Indicators for the Analysis of Learning and Practice Communities from the Perspective of Microblogging as a Provocative Sociolect in Virtual Space", Proceedings of the 5th International Scientific Conference eLSE-eLearning and Software for Education, Apr. 9-10, 2009.

Kelkar, "Visualizing Search Results as Web Conversations", Proceedings of the Workshop on Web Search Result Summarization and Presentation at the 18th International World Wide Web Conference, Apr. 20-24, 2009.

Nair, Lenin, "How to Remove Duplicate Content From Your Blogger Blog Posts to Avoid SERP Penalty", Retrieved at: <<http://cutewriting.blogspot.com/2008/10/how-to-remove-duplicate-content-from.html>>, Oct. 26, 2008.

Park et al., "Web Content Summarization Using Social Bookmarking Service", NII Technical Report, Apr. 23, 2008.

Xu et al., "Using Social Annotations to Improve Language Model for Information Retrieval", Proceedings of the 16th ACM Conference on Information and Knowledge Management, pp. 1003-1006, Nov. 6-10, 2007.

Hu et al., "Comments-Oriented Blog Summarization by Sentence Extraction", Proceedings of the 16th ACM Conference on Information and Knowledge Management, pp. 901-904, Nov. 6-10, 2007.

Zhu et al., "Tag-Oriented Document Summarization", Proceedings of the 18th International Conference on World Wide Web, pp. 1195-1196. Apr. 14, 2009.

Sharifi et al., "Summarizing Microblogs Automatically", Proceedings of Human Language Technologies: The 2010 Annual Conference of the North American Chapter of the Association for Computational Linguistics, pp. 685-688, Jun. 2010.

Zhou et al., "On the Summarization of Dynamically Introduced Information: Online Discussions and Blogs", AAAI Symposium on Computational Approaches to Analyzing Weblogs AAAI-CAAW, 2006.

Balahur et al., "Summarizing Threads in Blogs Using Opinion Polarity", Proceedings of the International Workshop on Events in Emerging Text Types, pp. 23-31, 2009.

Harrison, David, "Using Micro-Blogging to Record Architectural Design Conversation Alongside the Bim", Retrieved at: <<http://www.stress-free.co.nz/using_microblogging_to_record_architectural_design_conversation_alongside_the_BIM>>, May 11, 2009.

Digital Video Broadcasting, "DVB: IP Datacast over DVB-H: Service Purchase and Protection", DVB Document A100, Jul. 2009.

Valverde et al., "Digital Rights Management", Master's Thesis, Report No. LITH-ISY-EX-3423-2003, Jul. 15, 2003.

Notice of Allowance mailed Oct. 29, 2015 from U.S. Appl. No. 13/733,009, 7 pages.

Notice of Allowance mailed Oct. 23, 2015 from U.S. Appl. No. 12/979,232, 5 pages.

Notice of Allowance mailed Jul. 6, 2015 from U.S. Appl. No. 12/979,232, 5 pages.

Notice of Allowance mailed Jul. 7, 2015 from U.S. Appl. No. 13/733,009, 7 pages.

Amendment filed Jul. 9, 2015 to Final Office Action mailed Apr. 6, 2015 from U.S. Appl. No. 13/427,584, 11 pages.

International Preliminary Report on Patentability mailed Jul. 16, 2015 from PCT/US2013/078394, 7 pages.

International Preliminary Report on Patentability mailed Jul. 16, 2015 from PCT/US2013/078395, 9 pages.

Final Office Action mailed Aug. 14, 2015 from U.S. Appl. No. 13/733,034, 22 pages.

"InnovationQ—IP.com", Retrieved Jun. 28, 2015, https://iq.ip.com/discover, 7 pages.

Examiner Initiated Interview Summary mailed Jul. 1, 2013 from U.S. Appl. No. 12/979,232, 2 pages.

Response filed Sep. 9, 2014 to Final Office Action mailed Jun. 10, 2014 from U.S. Appl. No. 12/979,232, 13 pages.

Final Office Action mailed on Jan. 27, 2015 from U.S. Appl. No. 13/733,009, 11 pages.

Notice of Allowance with Applicant Initiated Interview Summary mailed Aug. 21, 2015 from U.S. Appl. No. 13/427,584, 10 pages.

Notice of Allowance mailed Mar. 26, 2015 from U.S. Appl. No. 12/979,232, 5 pages.

Final Office Action mailed Apr. 6, 2015 from U.S. Appl. No. 13/427,584, 14 pages.

* cited by examiner

RANKING AUTHORS IN SOCIAL MEDIA SYSTEMS

BACKGROUND

Social media are media for social interaction and typically employ web-based technologies to turn communications into dialogs between users. Content in social media systems is generated by users, of which there may be hundreds of millions in any given social media system. This content posted by users can provide valuable information as part of the World Wide Web in real-time. However, as there are no controls on joining social media systems, there are many users—indeed the majority—that are not authorities on any given topic. Furthermore, many user accounts may not even belong to a real person. Spam and aggregator accounts of varying degrees of severity and deception exist in large quantities, adding little or no value to the information provided by a social media service. In stark contrast to all of this noise in the social media signal, many end user scenarios hinge on finding users that are the most authoritative on a given topic. Social authority is developed, for example, when an individual or organization establishes themselves as an expert in a given field.

Most social media systems (Twitter®, for example) are organized using social graphs and often report some properties of users such as the number of followers and the number of times a user's content has been passed along in the system. One form of ranking user content is to use these social graph metrics. However social graphs are prone to simple spamming, and even in the absence of such spamming tend to be dominated by celebrities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The author ranking technique described herein is a technique to rank authors in social media systems along various dimensions, using a variety of statistical methods. More particularly, the author ranking technique ranks authors in social media systems through a combination of statistical techniques that leverage usage metrics, and social and topical graph characteristics. In various exemplary embodiments, the technique can rank author authority by the following:

Temporal analysis of link sharing in which authority is computed based on a user's propensity to provide early links to Web pages that subsequently become popular.

Topical authority based on the author's links and content updates in specific topic areas.

Popularity and influence based on nodal properties of the authors (e.g., metrics such as the number of followers, number of posts such as microblogs resent, mention counts in which an author is mentioned, and the number of on-line friends an author has).

DESCRIPTION OF THE DRAWINGS

The specific features, aspects, and advantages of the disclosure will become better understood with regard to the following description, appended claims, and accompanying drawings where:

DETAILED DESCRIPTION

In the following description of the author ranking technique, reference is made to the accompanying drawings, which form a part thereof, and which show by way of illustration examples by which the author ranking technique described herein may be practiced. It is to be understood that other embodiments may be utilized and structural changes may be made without departing from the scope of the claimed subject matter.

1.0 Author Ranking Technique

The following sections provide an introduction and an overview of the author ranking technique, as well as an exemplary architecture and processes for employing the technique. Details for exemplary embodiments of the technique are also provided.

1.1 Introduction

Users of social media have been called "prosumers" to reflect the notion that the consumers of this form of media are also its content producers. Especially in microblogging contexts, for any given topic, the number of these content producers even in a single day can easily reach tens of thousands. While this large number can generate notable diversity, it also makes finding the true authorities, those generally rated as interesting and authoritative on a given topic, challenging.

Despite the important role authors serve in posting content or microblogging, this challenge of identifying true authorities is trickier than it appears at first blush. Perhaps the most important nuance in the discovery of topical authorities is avoiding overly general authorities that typically are highly visible in the network of users because of extremely high values on metrics like "follower count". As example, consider the topic "oil spill", which is part of the larger category of "news." Top news outlets such are authoritative but do not author exclusively or even primarily on this topic and thus recommending only these users is suboptimal. Instead, end users likely are looking for a mix that includes these larger organizations along with lesser known authors such as environmental agencies and organizations, or even the environment departments of the larger news organization in the case of the oil spill topic.

Furthermore, authors may not even exist prior to an event and thus while highly authoritative, they are less discoverable due to low network metrics like the follower count and amount of content produced to date. Due to these rapidly changing dynamics of users on social media sites, traditional algorithms to find authorities based on the popular PageRank algorithm over the social graph of users are sensitive to celebrities and insufficient to find true authorities. Additionally, graph based algorithms are computationally infeasible for near real time scenarios.

1.2 Overview of the Technique

Figure 1:
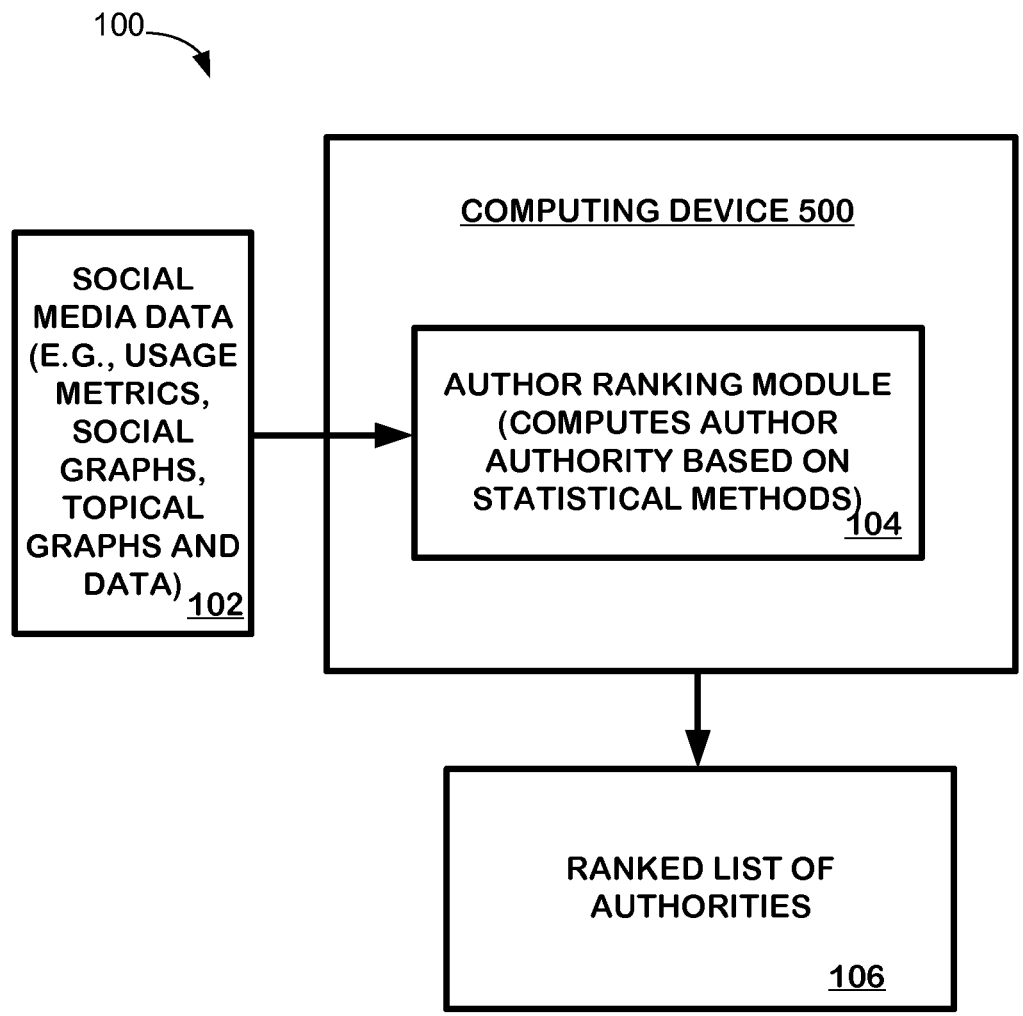
FIG. 1 is an exemplary architecture for employing one exemplary embodiment of the author ranking technique described herein.

The author ranking technique described herein uses a variety of techniques that incorporate both social and topic-related authoring metrics. More particularly, the author ranking technique described herein ranks authors in social media systems through a combination of statistical techniques that leverage usage metrics, and social and topical graph characteristics. FIG. 1 provides an exemplary architecture 100 for employing the exemplary embodiments of the technique described below. As shown in FIG. 1, social media data 102 (e.g., usage metrics, social graphs, topical graphs and other data) are input into a computing device 500 (to be discussed in greater detail later with respect to FIG. 5) that contains an author ranking module 104. The author ranking module 104 determines a user's authority based on a variety of statistical methods and outputs a ranked list of authors 106 based on their authority. In various embodiments, the technique can rank author authority by the following:

- Temporal analysis of link sharing: authority based on propensity to provide early links to Web pages that subsequently become popular.
- Topical authority based on the author's links and content updates in specific topic areas.
- Popularity and influence based on nodal properties of authors (e.g., follower counts, microblogs or posts resent, mention counts and number of on-line friends)

Examples of these metrics and statistical techniques used are given below.

1.3 Authority Based on the Propensity to Provide Early Links

Figure 2:
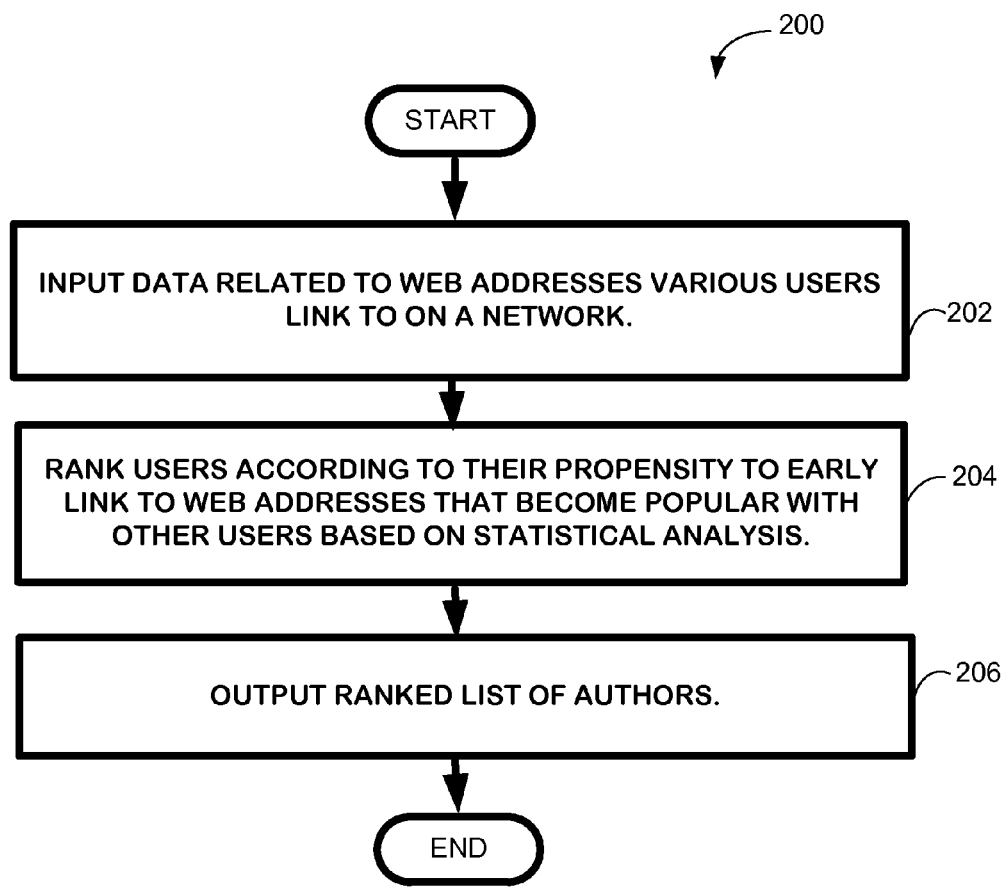
FIG. 2 depicts a flow diagram of an exemplary process for employing one embodiment of the author ranking technique wherein a propensity to early find popular links in used to establish author authority.
Figure 3:
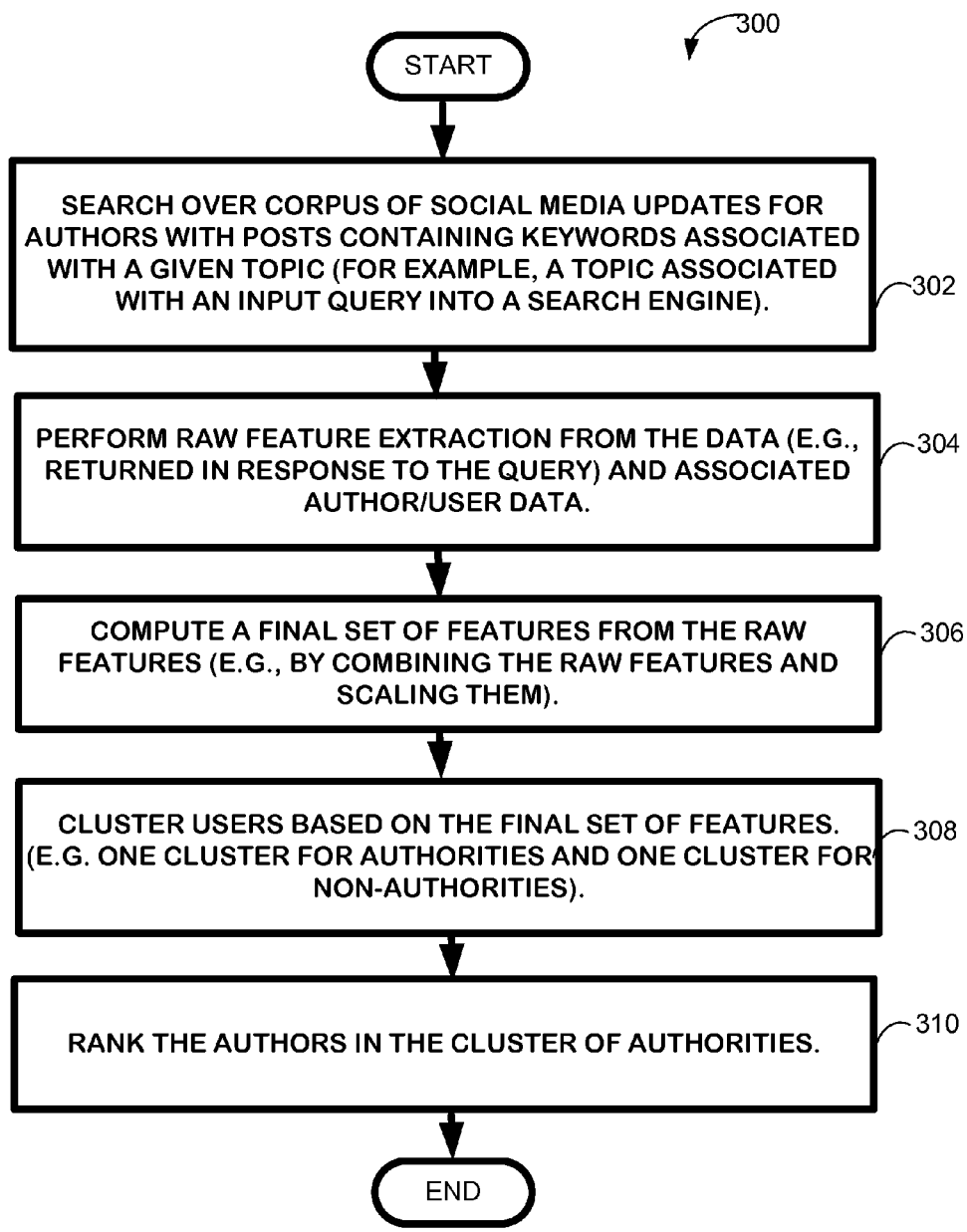
FIG. 3 depicts a flow diagram of an exemplary process for employing one embodiment of the author ranking technique wherein topical authority is used to establish author authority.

FIG. 2 provides an exemplary flow diagram of a process for determining author authority based on an author's propensity to early provide links (e.g., Uniform Resource Locator (URL) addresses) to Web sites or Web content that ultimately becomes popular. As shown in FIG. 2, block 202, data related to Web addresses various users of a social media system link to on a network is input. This includes, for example, the Web addresses each user linked to via social media systems and the time they linked to each Web address. As shown in block 204, the users are ranked according to their propensity to early link to Web addresses that become popular with other users based on statistical analysis of the input data. In one embodiment, the statistical analysis is based on performing a temporal analysis of links by the users to URL addresses that become popular among other users. For example, this temporal analysis can involve defining an author vector based on users of a social media system that access URL addresses and defining a document vector based on a predefined ranking for the domain where a corresponding URL address is found. Each of these two vectors is initialized. In one embodiment, each user in the author vector is set to one and each document in the document vector is set to the same ranking as its domain ranking. An adjacency matrix, A, is generated for all i users and all j URL addresses linked to, as $A_{i,j} = e^{1*author\_order_i} * \log(author\_count_j)$ where $author\_order_i$ is the chronological rank of linking to a URL address for a user, and where $author\_count_j$ defines how popular the URL address is and is the number of users linking to URL address j. The technique performs multiple iterations where the author vector is updated as $\vec{E} = \sqrt{\vec{Q}*A^T}$ using the latest document scores, and the document vector is updated as $\vec{Q} = \sqrt{\vec{E}*A}$ using the latest author scores. The author vector and the document vector are normalized and users are ranked by their score in the author vector. Mathematical details of this process are described below. Finally, as shown in block 206 a ranked list of the users based on the ranking is output. This ranked list can be used for, for example, ranking or re-ranking search results to take into account author authority or for filtering search results to exclude spammers.

1.3.1 Mathematical Computations for an Exemplary Embodiment for Ranking Authors Based on Propensity to Early Find Links The following steps provide the mathematical computations for one exemplary embodiment of ranking authors based on their propensity to early find links that are popular with other users.

1. Set $\vec{E}$ to be the Author vector $(1, 1 \ldots 1)$ (This represents the authority or expertise attributed to each author, initially set to uniform values for all authors).
2. Set $\vec{Q}$ to be the Document vector: $(DR_1, DR_2, \ldots, DR_n)$, where $DR_1$, $DR_2$ etc. are the domain ranks of each document. In one embodiment each document is represented by a URL for an associated Web page.
3. Performs steps 4, 5, 6 every time new data is received.
4. Compute A=GenerateAdjacencyMatrix( ). This adjacency matrix provides a rank of how early each author provides links to an associated URL.
   A is a matrix of size M*N, where M=# of authors and N=# of documents, where $$A_{i,j} = e^{-1*author\_order_i} * \log(author\_count_j)$$

The exponential part of the above equation ($e^{-1*author\_order_i}$) factors in the "early mover"-ness (e.g., how early the author links to a popular link) of the author. $author\_order_i$ is the chronological rank of posting the URL for $author_i$. Thus if the author is the first author to post the URL, the exponential part of the score for him will be $e^{-1*0}=1$. The 2nd author to link to the URL will get $e^{-1}$, 3rd $e^{-2}$ and so on.
   The $\log(author\_count_j)$ part factors in how popular the URL is. $author\_count_j$ is the number of authors linking to URL j. Thus more popular the URL, the higher the log count will be.
5. Loop till there is minimal difference in the author scores in consecutive iterations
   a. $\vec{E} = \sqrt{\vec{Q}*A^T}$
   b. $\vec{Q} = \sqrt{\vec{E}*A}$
   c. Normalize $\vec{E}$
   d. Normalize $\vec{Q}$
   (The square-root helps in dampening the effect that the top few URLs and authors have on the ranking.)
6. L=Sort users by their expertise score in $\vec{E}$

1.4 Topical Authority

Content in microblogging social media systems, such as Twitter® for example, is produced and posted by tens to hundreds of millions of users. This diversity is a notable strength, but also presents a challenge of finding the most interesting and authoritative authors for any given topic. To address this issue, one embodiment of the author ranking technique first determines a set of features for characterizing social media authors, including both nodal and topical metrics which will be described in greater detail in the following sections. The author ranking technique then performs probabilistic clustering over this feature space, followed by a within-cluster ranking procedure, to yield a final list of top authors for a given topic. The technique is computationally feasible in near real-time scenarios making it an attractive alternative for capturing the rapidly changing dynamics of microblogs and blogs. The following paragraphs provide an exemplary process and exemplary calculations for determining topical authority.

1.4.1 Exemplary Process for Determining Topical Authority

One exemplary process 300 for determining topical authority according to one embodiment of the author ranking technique is described below.

As shown in block 302, the technique searches over a corpus of social media updates for authors with posts (for example, microblog or blog posts) containing keywords associated with a given topic, for example, one associated with an input query into a search engine. This topic could also be expanded to include latent topics if desired via conventional methods.

As shown in block 304, raw feature extraction is performed from the data (e.g., the data returned in response to the query) and associated author/user data. In this step a number of features are extracted about the authors and posted data resulting from the query (e.g., given topic) described with respect to block 302. In one embodiment of the technique, these features can include, for example: a raw count of topical posts; a number of times an author is cited by other authors; a number of times an author cites themselves; a number of times an author is replied to; a total number of posts authored in the system; a number of times they are mentioned by other users; a number of links an author has shared; a number of uses by an author of explicitly denoted keywords (e.g., hash tags); a similarity index that computes how similar an author's recent content is to previous content; a timestamp of an author's first post on the topic; a timestamp of their most recent post on the topic; a count of friends/followers who also post on the topic; a count of an author's social media friends/followers who posted on the topic before the author in question posted on the topic; and a count of an author's social media friends/followers who posted on the topic after the author in question posted on the topic. Of course, many other types of features could also be used. Section 1.4.2 provides a more detailed discussion of raw features extracted in one embodiment of the technique.

As shown in block 306, a final set of features is computed. In one embodiment, the raw features are scaled (e.g., using log scales) and combined to form this new set of final features. Various final features can be calculated, as further discussed in detail in Section 1.4.2.

At this stage, the number of users can also be pruned according to heuristics on these final features (e.g., users with a topical signal below a threshold can be discarded).

As shown in block 308, the remaining users are then clustered based on the final set of features. Different techniques can be used for this purpose, but in one embodiment the technique uses Gaussian mixture modeling to separate users into two clusters—authorities and non-authorities, with the difference determined by heuristics such as the number of authors in each cluster and the characteristics of those authors.

Finally, as shown in block 310, the authors in the cluster of authorities are ordered. One embodiment of the technique orders the authors in the authority cluster based on where their scores for the features fall on a normal distribution (i.e., according to the p-value describing their scores on the various features). However, other ordering approaches are available.

1.4.2 Exemplary Computations for Calculating Topical Authority

In this section the computations for finding topical authorities in one exemplary embodiment of the technique are described. A list of metrics extracted and computed for each potential authority for this embodiment are shown in Table 1

1.4.2.1 User Metrics

Given the nature of posts in social media systems such as microblogs (e.g., short text snippets, often containing URLs), often called tweets in the popular Twitter® social media network, and the way they are often used (e.g., for light conversation via replies and for information diffusion via re-sending the microblog), one embodiment of the technique focuses on metrics that reflect the impact of users in the system, especially with respect to the topic of interest. Although this embodiment of the author ranking technique is described in terms of microblogs, it is to be understood that the technique may be applied to related forms of social media such as, for example, status updates in social networks and blog posts.

More particularly, in one embodiment micro-blog posts are categorized into three categories: Original microblog (e.g., tweet) (OT), Conversational microblog (CT), Repeated microblog (RT).

OT: Original microblogs, (OT), are the microblogs produced by the author that are not RT or CT.

CT: A conversational microblog (CT), is directed at another user (e.g., as denoted by the use of the @username token preceding the text or from the associated meta-data available).

RT: These repeated microblogs, (RT), are produced by someone else but the user copies or forwards them in their social media network. These microblogs are typically preceded by "RT @username" in most social media systems.

In addition to the original conversational and repeated microblog metrics, the technique computes metrics around the mentions of a user (M) as well as their graph characteristics (G). See Table 1 for the full list of metrics used in one exemplary embodiment. Most of the metrics in Table 1 are self-explanatory, but some are briefly touched upon here. A user of a social media system can mention other users using the "@user" tag. In one embodiment of the technique, the first mention in CT and RT is part of the header metadata of a microblog, so the technique discards the first mention in these two cases to accurately estimate the genuine mentions that an author makes. Hashtag keywords (OT4) are words starting with the # symbol and are often used to denote topical keywords in micro-blog systems.

The self-similarity score (OT3) reflects how much a user borrows words from their previous posts (on topic and off topic). In one embodiment, in order to compute this score, the technique first uses a stop word list to remove common words and then considers the resulting microblogs as a set of words. The self-similarity score $S(s1, s2)$ between two sets of words s1, s2 is defined as:

$$S(s1, s2) = \frac{|s1 \cap s2|}{|s1|} \qquad (1)$$

The self-similarity score S is not a metric because $S(x,y) \neq S(y,x)$. The technique chooses this similarity score as it is efficient to compute and because it is desirable to estimate how much a user borrows words from her previous posts.

In order to compute the self-similarity score for an author, the technique averages similarity scores for all temporally ordered microblog posts.

$$S(a) = \frac{2 \cdot \sum_{i=1}^{n} \sum_{j=1}^{i-1} S(s_i, s_j)}{(n-1) \cdot n} \qquad (2)$$

In Equation 2, it is assumed that the microblog posts of an author a are ordered based on increasing timestamp values, s.t., time($s_i$)<time($s_j$):∀i<j. A high value of S indicates that user borrows a lot of words or hyperlinks from her previous microblogs (suggesting spam behavior). A small value indicates that the user posts on a wider swath of topics or that she has a very large vocabulary. The self-similarity score is beneficial in this case as the extracted topics are based on simple keyword matching, which might lead one to miss related microblogs not containing the exact keywords. S ensures that such a similarity is established based on co-occurring terms.

TABLE 1

List of metrics of potential authorities employed in one embodiment of the Author Ranking Technique described herein.

| ID | Feature |
|---|---|
| OT1 | Number of original microblog posts |
| OT2 | Number of links shared |
| OT3 | Self-similarity score that computes how similar an author's recent microblog is w.r.t. to her previous microblogs |
| OT4 | Number of keyword hashtags used |
| CT1 | Number of conversational microblog posts |
| CT2 | Number of conversational microblog posts where conversation is initiated by the author |
| RT1 | Number of times author's microblog posts resent by others |
| RT2 | Number of unique microblog posts of an author resent by others |
| RT3 | Number of unique users who resent author's microblog posts |
| M1 | Number of mentions of the other users |
| M2 | Number of unique users mentioned by the author |
| M3 | Number of mentions by others of the author |
| M4 | Number of unique users mentioning the author |
| G1 | Number of topically active followers of the author |
| G2 | Number of topically active friends of the author |
| G3 | Number of followers microblogging on topic after the author |
| G4 | Number of friends microblogging on topic before the author |

OT = Original microblogs, CT = Conversational microblogs, RT = Repeated microblogs, M = Mentions, and G = Graph Characteristics.

1.4.2 Feature List

In one embodiment of the author ranking technique, the technique combines the metrics in Table 1 to create a set of features for each user. For a given user, the technique extracts the following textual features across their microblogs on the topic of interest:

$$\text{Topical signal } (TS) = \frac{OT1 + CT1 + RT1}{|\text{\# microblogs}|} \qquad (3)$$

Topical signal, TS, estimates how much an author is involved with the topic irrespective of the types of microblogs posted by her. Another factor considered is the originality of an author's microblogs, which is calculated as follows:

$$\text{Signal strength } (SS) = \frac{OT1}{OT1 + RT1} \qquad (4)$$

Signal strength, SS, indicates how strong an author's topical signal is, such that for a true authority this value should approach 1. Additionally, the technique considers how much an author posts on topic and how much she or he digresses into conversations with other users:

$$\text{Non-Chat signal } (\overline{CS}) = \frac{OT1}{OT1 + CT1} + \lambda \frac{CT1 - CT2}{CT1 + 1} \qquad (5)$$

The intuition behind this formulation of $\overline{CS}$ is that the technique aims to discount the fact that the author did not start the conversation but simply replied back out of courtesy. This can be desirable when one wishes to find real people (i.e. not formal organizations) who are somewhat more social. Since one wants $$\overline{CS} < \frac{OT1}{OT1 + CT2},$$

one can solve for λ, by putting this constraint in equation 5 to get:

$$\lambda < \frac{OT1}{OT1 + CT2} \cdot \frac{CT1 + 1}{OT1 + CT1} \qquad (6)$$

Empirically, λ≈0.05 satisfies the above constraint for most users. Large values of λ can skew the ranking towards real and socially active people where as small value does not.

The technique computes the impact of an author's microblog by considering how many times it has been resent by others:

$$\text{Resending (of microblog) impact } (RI) = RT2 \cdot \log(RT3) \qquad (7)$$

RI indicates the impact of the content generated by the author. This definition of RT3 ensures that the impact for an author who has few overzealous users resending her microblog content many of times is dampened. Note that here one considers 0·log(0)=0 as the corner case because RT3=0⇔RT2=0.

In order to consider how much an author is mentioned with regards to the topic of interest, the technique considers the mention impact of the author as follows:

$$\text{Mention impact } (MI) = M3 \cdot \log(M4) - M1 \cdot \log(M2) \qquad (8)$$

Mention impact, MI, is based on a similar formulation as that of RI with the difference that one takes into account a factor that estimates how much the author mentions others. This ensures that the technique incorporates the mentions an author receives purely based on her merit and not as a result of her mentioning others.

In order to estimate how much influence is diffused by the user in her network, the technique takes into account the following feature:

$$\text{Information diffusion } (ID) = \log(G3+1) - \log(G4+1) \qquad (9)$$

Information disfusion, ID, in one embodiment of the author ranking technique, is the ratio of the number of users activated by the author and the number of users that activated the author on log-scale. Here "activated" means microblogging on a topic after another user from the user's network has microblogged on the topic before the author. The technique adds 1 in this case and rests other cases in order to avoid a divide by zero operation. This also fits well with the purview of Laplace smoothing. Note that ID does not take into consideration the advantage an author with large in-degree and low out-degree (the number of users linking in to the author (in degree) and the number of users the author links to (out degree)) might have, namely that G3 can be a large value whereas G4 remains bounded by a small number of friends. For such a case to occur an author must be amongst the early publishers on the topic, which is a sign of authoritativeness. An alternate formulations of ID could be:

$$ID_1 = \log\left(\frac{G3+1}{G1+1}\right) - \log\left(\frac{G4+1}{G2+1}\right) \quad (10)$$

$ID_1$ normalizes ID on raw count of topical followers and friends. This formulation leads to less effective results than the un-normalized version. One reason is that it fails to capture the prominence of a person as indicated by the raw counts itself.

Additionally, one embodiment of the technique considers the raw number of topically active users around the author, as follows:

$$\text{Network score (NS)} = \log(G1+1) - \log(G2+1) \quad (11)$$

In one embodiment, in all of these cases, the technique considers log scaling around network-based metrics because the underlying distribution of network properties (e.g., the number of users following the author) follows a tail distribution with some users with orders of magnitude larger metric values than others. This could lead to skew while clustering.

It should be noted that all these features are fairly straightforward to compute given an author's microblog posts and a one hop network. Additionally these features can be computed in parallel for all the users.

1.4.2.3 Clustering and Ranking

One embodiment of the author ranking technique uses a Gaussian Mixture Model to cluster users into two clusters over their feature space. A motivation for the clustering is to reduce the size of the target cluster (i.e., the cluster containing the most authoritative users). This also makes the subsequent ranking of users more robust because it is less sensitive to outliers such as celebrities. The following subsection describes Gaussian Mixture Modeling in general and how the technique uses it.

1.4.2.4 Gaussian Mixture Model

Clustering based on Gaussian mixture model is probabilistic in nature and aims at maximizing the likelihood of the data given k Gaussian components. Consider n data points $x = \{x_1, x_2, \ldots, x_n\}$ in d-dimensional space, the density of any given data point x, can be defined as follows:

$$p(x|\pi, \Theta) = \sum_{z=1}^{k} p(z|\pi) \cdot p(x|\theta_z) \quad (12)$$

where $\pi$ is the prior over the k components and $\Theta = \{\theta_z : 1 \leq z \leq k\}$ are the model parameters of the k Gaussian distributions i.e. $\theta_z = \{\mu_z, \Sigma_z\}$ and $P(x|\theta_z)$ is defined as:

$$p(x|\theta_z) = \frac{1}{((2\pi)^d |\Sigma_z|)^{\frac{1}{2}}} \exp\left\{-\frac{1}{2}(x-\mu_z)^T \Sigma_z^{-1} (x-\mu_z)\right\} \quad (13)$$

Under the assumption that the data points are independent and identically distributed (i.i.d), one can consider the likelihood of the observed samples as follows:

$$p(x|\pi, \Theta) = \prod_{i=1}^{n} P(x_i|\pi, \Theta) \quad (14)$$

-continued $$= \prod_{i=1}^{n} \sum_{z=1}^{k} p(z|\pi) \cdot p(x_i|\theta_z) \quad (15)$$

In order to maximize this likelihood, in one embodiment the author ranking technique uses Expectation Maximization (EM). EM is an iterative algorithm in which each iteration contains an E-step and a M-step. In the E-step, the technique computes the probability of the k Gaussian components given the data points, $p(z|x_i, \Theta)$ using Bayes theorem:

$$p(z|x_i, \pi, \Theta) = \frac{p(x_i|\theta_z) \cdot p(z|\pi)}{\sum_{z=1}^{k} p(x_i|\theta_z) \cdot p(z|\pi)} \quad (16)$$

In the M-step, this embodiment of the technique computes the model parameters in order to maximize the likelihood of the data, as follows:

$$\mu_z = \frac{\sum_{i=1}^{n} x_i \cdot p(z|x_i, \pi, \Theta)}{\sum_{i=1}^{n} p(z|x_i, \pi, \Theta)} \quad (17)$$

$$\Sigma_z = \frac{\sum_{i=1}^{n} (x_i - \mu_z) \cdot (x_i - \mu_z)^T \cdot p(z|x_i, \pi, \Theta)}{\sum_{i=1}^{n} p(z|x_i, \pi, \Theta)} \quad (18)$$

$$p(z|\pi) = \frac{\sum_{i=1}^{n} p(z|x_i, \pi, \Theta)}{\sum_{z=1}^{k} \sum_{i=1}^{n} p(z|x_i, \pi, \Theta)} \quad (19)$$

The EM algorithm is run iteratively until the likelihood reaches the maximum possible value. In one embodiment, the GMM model requires initial estimates of the model parameters $\theta$ and prior probability of the components $p(z|\pi)$. In one embodiment the author ranking technique uses K-means to derive these initial parameters. In general, GMM performs better than classical hard clustering algorithms such as K-means as it is less sensitive to outliers. A drawback of GMM is that it is sensitive to initial estimates of model parameters. This problem can be eliminated by running GMM with boosting. Since, this can be computationally expensive, in one embodiment the technique simply runs five instances of GMM (with maximum of 50 iterations each) and picks the one with largest log likelihood as the best estimate of the underlying clusters.

The above clustering algorithm gives probabilistic assignments of data points belonging to a given cluster $p(z|x, \pi, \Theta)$. For each cluster, in one embodiment, the technique picks all the points with this probability to be greater than 0.9. This is done because the true representative points per cluster is desired. Using these points, the technique computes the average topical signal, resending impact and mention impact (TS, RI, MI) per cluster and picks the cluster with the larger TS, RI, MI (or best of 3) as the target cluster. This simple strategy of determining which cluster to pick works well in practice.

The target cluster typically contains a small number of users (a few hundred to thousands) which is a huge reduction compared to the actual number of users (ranging from tens of thousands to hundreds of thousands) of a social media system. In order to rank authors within the target cluster, two potential methods can be employed: List based ranking and Gaussian based ranking. In order to describe these ranking methods, consider that one has n data points $x=\{x_1, x_2, \ldots, x_n\}$ where each data point is a d-dimensional vector, i.e., $x_i=[x_i^1, x_i^2, \ldots, x_i^d]^T$. In list based ranking, the technique sorts authors on feature $f \in \{1, 2, \ldots, d\}$ and gets the rank of $i^{th}$ author in this ranked list, denoted as $R_L(x_i^f)$. The final rank of an author is the sum of ranks for all the features, $R_L(x_i) = \Sigma_{f=1}^d R_L(x_i^f)$, which is then used to sort the authors to get a ranked list. Assuming the top k authors is desired, this results in time complexity of 0(dnlogn+k). This list based approach appears to provide inferior results compared to a Gaussian ranking method which is described in the next section.

1.4.6 Gaussian Ranking Algorithm

In one embodiment, the technique assumes features to be Gaussian distributed (which is true in most cases, though with a bit of skew in some cases). For any given feature f, the technique computes the mean $\mu_f$ and standard deviation $\sigma_f$ based on the points in the target cluster. The Gauss rank $R_G$ of a given data point is then defined as follows:

$$R_G(x_i) = \Pi_{f=1}^d \int_{-\infty}^{x_i^f} N(x; \mu_f, \sigma_f) \quad (20)$$

where $N(x; \mu_f, \sigma_f)$ is the univariate Gaussian distribution with model parameters as $\mu_f$ and $\sigma_f$. The inner integral in this equation computes the Gaussian cumulative distribution at $x_i^f$. Gaussian CDF is a monotonically increasing function well suited to the ranking problem as a higher value is preferred over a low value for each feature. Alternately, if a low value is preferred for some features, then $x_i^f$ could be replaced by $-x_i^f$ in the above formula. Gaussian CDF (for standard normal) can be computed in 0(1) time using a pre-computed table of error functions. This results in an algorithm with time complexity of 0(dn+k) which is a reduction by a factor of logn over List base ranking.

Additionally, a weighted version of the Gaussian ranking method can be employed. In order to incorporate weights in the above Gaussian ranker, the technique considered the following definition of $R_G$:

$$R_G(x_i) = \Pi_{f=1}^d [\int_{-\infty}^{x_i^f} N(x; \mu_f, \sigma_f)]^{w_f} \quad (21)$$

where $w_f$ is the weight that the technique puts on feature f. Using this fact, it can be observed that the weights $w_f$ are immune to the normalization factor (as long as the normalization factor is greater than 0). In this case the normalized rank (with normalization factor N) is $R'_G = R_G^{1/N}$, which does not change the ordering of data points for N>0. Hence, the only constraint put on these weights is that $\{\forall f: 0 \leq w_f \leq 1\}$.

1.5 Popularity and Influence Based on Nodal Properties:

In one embodiment of the author ranking technique, authors can be ranked according to their position along any number of nodal characteristic dimensions, such as the number of attributes made by other authors. These rankings are subject to relevant transforms (e.g., log scaling) and can be used in combination with one another. This embodiment of the author ranking technique uses fewer metrics than the embodiment of the technique discussed in Section 1.4 and focuses on nodal metrics (the metrics of an individual user rather than the network). It also uses a simpler way to combine these metrics than the embodiment discussed in Section 1.4.

A key notion in this form of ranking is that of information diffusion: how information spreads in social media systems and what properties of users influence this spread. Authors high in dimensions known to correlate with information diffusion should preferably be of higher rank. In one embodiment the technique measures when a post of one user is shared by a second user with the followers of the second user to measure information diffusion.

Figure 4:
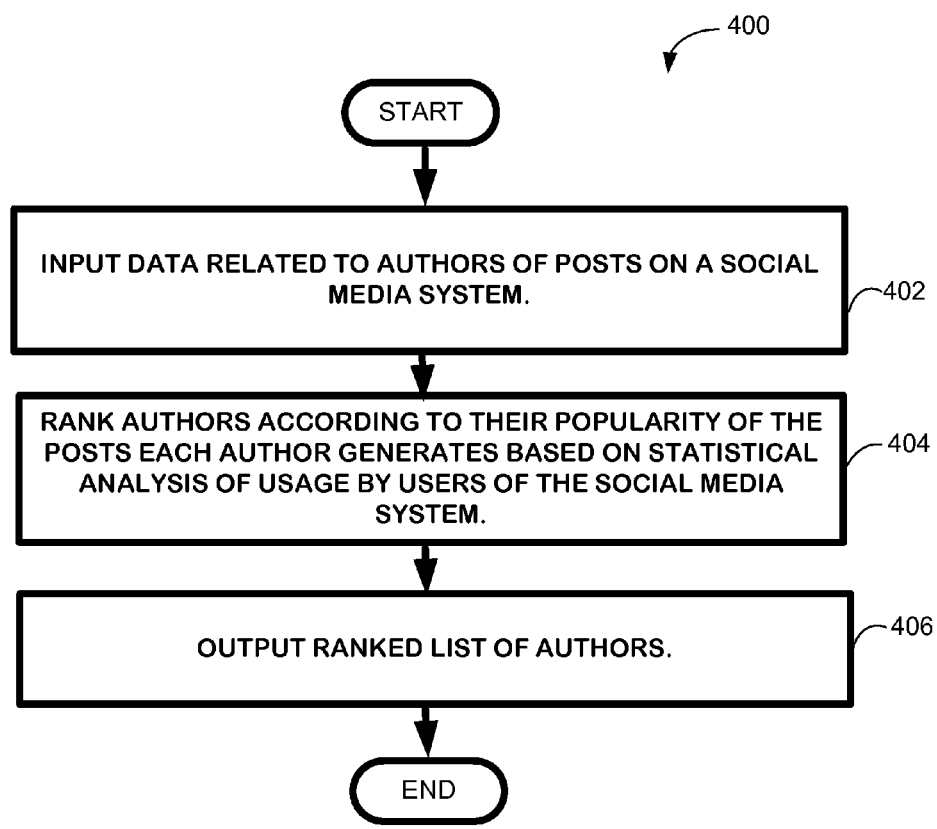
FIG. 4 depicts a flow diagram of an exemplary process for employing one embodiment of the author ranking technique wherein popularity and influence based on nodal properties is used to establish author authority.

One embodiment 400 of the author ranking technique operates as follows as shown in FIG. 4. Data related to authors of posts on a social media system are input, as shown in block 402. The authors of the posts are ranked according to the popularity of the posts each author generates based on statistical analysis of usage by users of the social media system, as shown in block 404 the statistical analysis comprises popularity of each author based on the nodal properties of each author. For example, the nodal properties could include the number of users that follow the author's posts/microblogs and the number of times the author's micro-blogs are forwarded from one user to another user. The rank for a given user is determined on each of the metrics of interest and these ranks can be combined linearly, such as by taking the mean rank or through any other combination, in order to determine the final rank for that user. Once the statistical analysis is complete a ranked list of the authors is output, as shown in block 406.

2.0 The Computing Environment

The author ranking technique is designed to operate in a computing environment. The following description is intended to provide a brief, general description of a suitable computing environment in which the author ranking technique can be implemented. The technique is operational with numerous general purpose or special purpose computing system environments or configurations. Examples of well-known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 5:
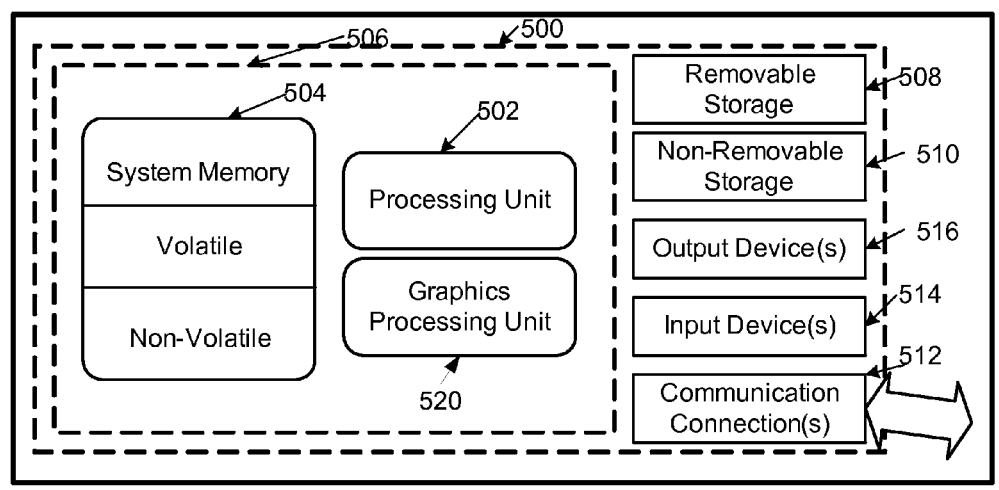
FIG. 5 is a schematic of an exemplary computing device which can be used to practice the author ranking technique.

FIG. 5 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 5, an exemplary system for implementing the author ranking technique includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features/functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Computer readable media include both transitory, propagating signals and computer (readable) storage media. Any such computer storage media may be part of device 500.

Device 500 also can contain communications connection(s) 512 that allow the device to communicate with other devices and networks. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 500 may have various input device(s) 514 such as a display, keyboard, mouse, pen, camera, touch input device, and so on. Output device(s) 516 devices such as a display, speakers, a printer, and so on may also be included. All of these devices are well known in the art and need not be discussed at length here.

The author ranking technique may be described in the general context of computer-executable instructions, such as program modules, being executed by a computing device. Generally, program modules include routines, programs, objects, components, data structures, and so on, that perform particular tasks or implement particular abstract data types. The author ranking technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A process implemented by a computing device, the process comprising:
    obtaining data indicating that authors in a social media system provided links to network content to other users of the social media system;
    based on statistical analysis of the data, ranking individual authors of the social media system according to their propensity to provide individual links to corresponding network content that becomes popular with the other users of the social media system, the ranking comprising:
    defining author scores of the individual authors,
    defining document scores of the individual links,
    determining corresponding chronological orders in which the individual authors of the social media system provided the individual links to the other users of the social media system,
    determining respective popularities of the individual links,
    updating the document scores using the author scores, the chronological orders in which the individual links were provided by the individual authors, and the respective popularities of the individual links to generate update document scores, and
    updating the author scores using the updated document scores, the chronological orders in which the individual links were provided by the individual authors, and the respective popularities of the individual links to generate updated author scores; and
    outputting a ranked list of the individual authors based on the updated author scores.

2. The process of claim 1, wherein the network content comprises web pages and the individual links comprise Uniform Resource Locator (URL) addresses of the individual web pages.

3. The process of claim 2, wherein:
    the author scores are included in an author score vector, the document scores are included in a document score vector, and the chronological orders and the respective popularities are represented in an adjacency matrix,
    the updating the document scores comprises multiplying the author score vector by the adjacency matrix, and
    the updating the author scores comprises multiplying the document score vector by the adjacency matrix.

4. The process of claim 3, further comprising:
    initializing each entry in the document score vector to a corresponding domain rank.

5. A computing device comprising:
    at least one processing unit; and
    one or more computer storage media storing instructions which, when executed by the at least one processing unit, cause the at least one processing unit to:
    obtain data indicating the authors in a social media system provided links to network content to other users of the social media system;
    rank individual authors of the social media system according to their propensity to provide individual links to corresponding network content that becomes popular with the other users of the social media system, the individual authors being ranked by:
    defining author scores of the individual authors,
    defining document scores of the individual links,
    determining corresponding chronological orders in which the individual authors of the social media system provided the individual links to the users of the social media system,
    determining the respective popularities of the individual links,
    updating the document scores using the author scores, the chronological orders in which the individual links were provided by the individual authors, and the respective popularities of the individual links to generate updated document scores, and
    updating the author scores using the updated document scores, the chronological orders in which the individual links were provided by the individual authors, and the respective popularities of the individual links to generate updated author scores; and output a ranked list of the individual authors based on the updated author scores.

6. The computing device of claim 5, wherein the instructions cause the at least one processing unit to:

perform multiple iterations of the updating the document scores and the updating the author scores before the ranked list is output.

7. The computing device of claim 5, wherein the instructions cause the at least one processing unit to:

continue updating the document scores and the author scores until a given condition is reached, wherein the ranked list is output responsive to the given condition being reached.

8. The computing device of claim 7, wherein the given condition comprises a minimal difference between the updated author scores over consecutive iterations.

9. The computing device of claim 5, wherein the instructions cause the at least one processing unit to:

update the author scores using a mathematical function having a first component that represents the corresponding chronological orders in an exponent and a second component that applies a logarithm operation to the respective popularities.

10. The computing device of claim 9, wherein the instructions cause the at least one processing unit to:

update the document scores using the mathematical function having the first component and the second component.

11. The computing device of claim 5, wherein the document scores represent domain rankings.

12. The computing device of claim 5, wherein the instructions cause the at least one processing unit to:

rank search results based on the updated author scores.

13. The computing device of claim 5, wherein the instructions cause the at least one processing unit to:

filter search results to exclude spammers based on the updated author scores.

14. One or more hardware computer storage media storing instructions which, when executed by the at least one processing unit, cause the at least one processing unit to perform acts comprising:

obtaining data indicating that authors in a social media system provided links to network content to other users of the social media system;

ranking individual authors of the social media system according to their propensity to provide individual links to corresponding network content that becomes popular with the other users of the social media system based on statistical analysis of the data, the ranking comprising:

defining author scores of the individual authors, defining document scores of the individual links determining corresponding chronological orders in which the individual authors of the social media system provided the individual links to the other users of the social media system, determining respective popularities of the individual links, updating the document scores using the author scores, the chronological orders in which the individual links were provided by the individual authors, and the respective popularities of the individual links to generate update document scores, and updating the author scores using the updated document scores, the chronological orders in which the individual links were provided by the individual authors, and the respective popularities of the individual links to generate updated author scores; and outputting a ranked list of the individual authors based on the updated author scores.

15. The one or more hardware computer storage media of claim 14, the acts further comprising:

initializing the author scores to uniform values for each of the individual authors.

16. The one or more hardware computer storage media of claim 14, wherein the ranked list is sorted by the updated author scores.

17. The one or more hardware computer storage media of claim 14, the acts further comprising:

updating the document scores and the author scores iteratively using a particular mathematical term.

18. The one or more hardware computer storage media of claim 17, wherein the particular mathematical term comprises a first component representing the corresponding chronological orders, and a second component representing the respective popularities.

19. The one or more hardware computer storage media of claim 18, the acts further comprising:

updating the document scores by multiplying the updated author scores by the particular mathematical term; and updating the author scores by multiplying the updated document scores by the particular mathematical term.

20. The one or more hardware computer storage media of claim 19, the acts further comprising:

normalizing the updated author scores and the updated document scores, wherein the ranked list is based on the normalized updated author scores and the normalized updated document scores.

\* \* \* \* \*